Feb. 5, 1935.   H. S. VAN PATTER   1,989,955
JOINING SEPARATE BODIES
Filed May 18, 1932
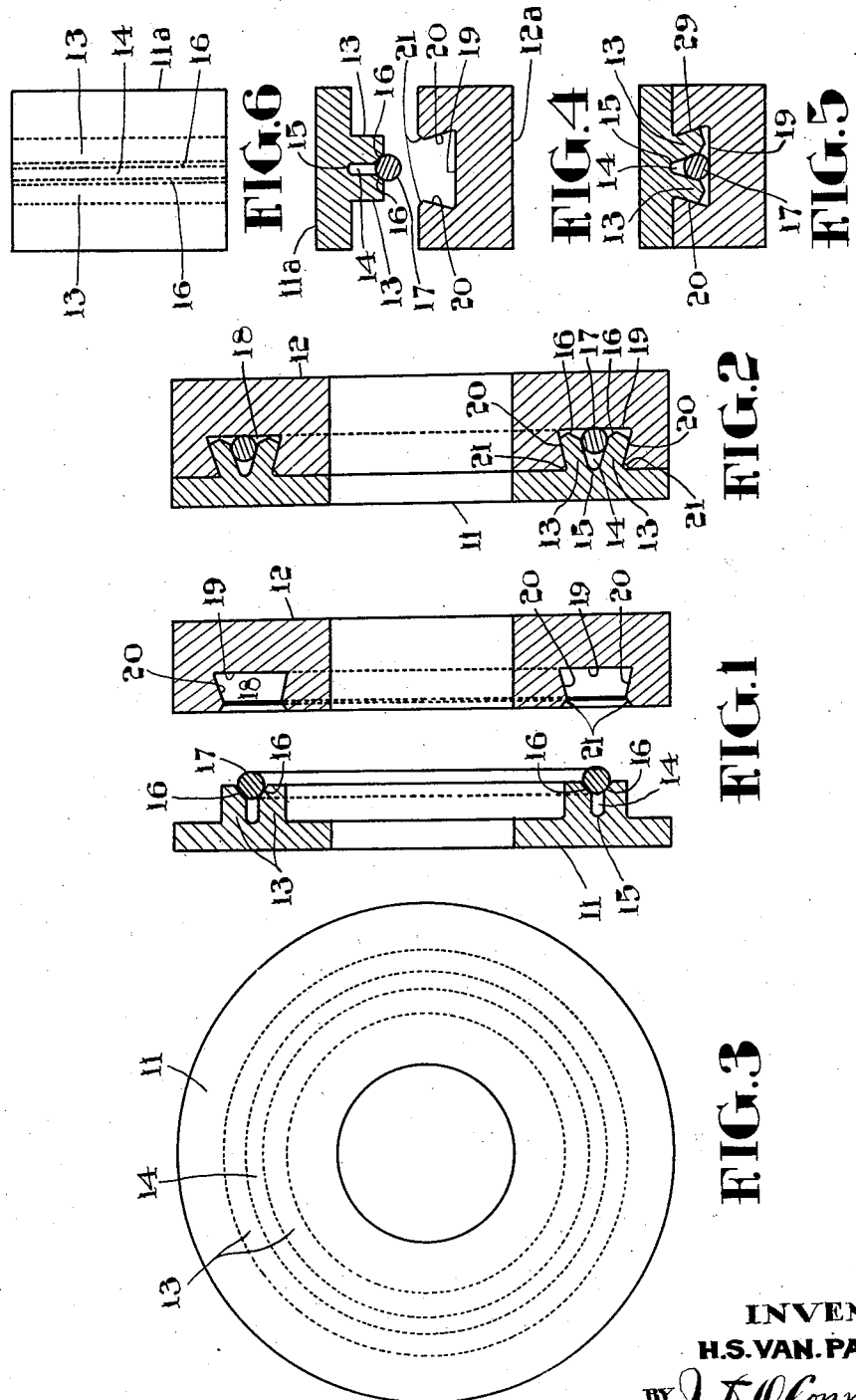
INVENTOR
H. S. VAN PATTER
BY J. T. O'Connell
ATTORNEY Patented Feb. 5, 1935

1,989,955

UNITED STATES PATENT OFFICE 1,989,955

JOINING SEPARATE BODIES

Hugh S. Van Patter, Lachine, Quebec, Canada, assignor to Dominion Engineering Works Limited, Lachine, Quebec, Canada Application May 18, 1932, Serial No. 612,008

4 Claims. (Cl. 29—148.2)

This invention relates to the joining of separate bodies and the object is to provide a satisfactory joint without resorting to welding or to the use of customary fastening means such as bolts, screws, pins, or the like.

The joint provided by the present invention is particularly useful for joining seat rings to the disc or casing elements of a gate valve. It may also be used to advantage for joining wearing strips to sluice gates and in various other relations where it is necessary or desirable, for manufacturing or other reasons, to unite two separate members or bodies without resorting to the customary methods mentioned above.

Two different embodiments of the invention are illustrated in the accompanying drawing wherein—

Fig. 1 is a transverse sectional view showing two complementary members or bodies of annular form equipped with joint forming means designed in accordance with this invention, said members or bodies being shown in separated relation as they appear prior to the actual joining operation.

Fig. 2 is a transverse sectional view similar to Fig. 1 but showing the annular members or bodies as they appear in assembled relation after the joining operation is complete.

Fig. 3 is a plan view of one of the annular members or bodies appearing in Figs. 1 and 2.

Fig. 4 is a view similar to Fig. 1 but showing complementary members or bodies of rectangular shape.

Fig. 5 is a transverse sectional view illustrating the assembled relation of the rectangular members or bodies appearing in Fig. 4.

Fig. 6 is a plan view of one of the rectangular members or bodies appearing in Figs. 4 and 5.

Referring more particularly to the drawing, 11 designates an annular body of ductile material adapted to be joined to the companion body appearing at 12. The body 11 is provided with parallel annular ribs 13 spaced inwardly from the annular edges of the body and separated from one another by an intervening annular groove 14 which is preferably formed with a rounded bottom wall 15. The inner free corner portions of the ribs 13 are bevelled as indicated at 16 and soldered at intervals to an annular rib extending ring 17 of circular cross section. The companion body 12 is provided with a dovetail groove 18 presenting a flat bottom wall 19 and undercut side walls 20, the latter having their outer corner portions bevelled or rounded off as indicated at 21.

The members 11 and 12 are joined together in the following manner. The ribs 13 carrying the ring 17 are inserted in the groove 18 until the ring 17 engages the bottom wall 19 of the groove. As the members 11 and 12 are forced into closer contact by rolling or otherwise the continued inward movement of the ribs 13 causes the same to slide over the ring 17 and to be thereby deflected outwardly into interlocking engagement with the undercut side walls 20 of the groove, it being understood that the solder or other temporary connection provided between the ring 17 and the ribs 13 is such as to be easily disrupted by the pressure applied in forcing the members 11 and 12 together.

The construction shown in Figs. 4 to 6 is the same as described in connection with the preceding figures, except that in this case the members 11a and 12a are of rectangular shape or configuration. In both instances the rounded or bevelled surfaces 21 at the entrance of the groove 18 provide clearance which facilitates the outward bending of the ribs 13 into interfitting and interlocking engagement with the undercut side walls of the groove. The shape or configuration of the members joined as described herein may be varied within wide limits and it will also be obvious that the joint provided by this invention may be used in nearly every instance where it is desired to join two separate members in face to face relation. For example, the construction illustrated in Figs. 1 to 3 inclusive is particularly useful for the anchoring of annular members such as the seat rings of gate valves, whereas the construction illustrated in the remaining figures is useful, for example, in securing wearing strips to sluice gates or in other relations where the members to be joined together are of rectangular configuration. The ring 17 may also be made of triangular or any other desired cross section as an alternative to the circular cross section shown herein so long as the ring retains its capacity to spread the ribs 13 against the undercut walls of the groove during the joining operation.

I am aware that it is old to join two members in face to face relation by providing one member with a groove having undercut side walls and an integral ridge of metal at the bottom of the groove adapted to force the anchoring projections of the companion member into locking engagement with said walls. I am also aware that it has been proposed to join two members together by peening or hammering the metal of one member into a dovetail groove formed in the companion member. As compared with the first of these two earlier methods the present invention is of advantage in that the machining of the parts is more easily and accurately accomplished due, principally, to the use of a separate member for spreading the anchoring projections of one member into engagement with the undercut groove walls of the companion member. As compared with the second earlier method the present invention is of advantage in that the complementary members may be securely attached to each other by pressing, rolling, or hammering without distorting the body portions of said members.

Having thus described my invention, what I claim is:—

1. A construction comprising complementary members adapted to be automatically interlocked when forced together under pressure, one of said members being provided with a groove having undercut side walls sloping towards each other as they approach the mouth of the groove and the companion member being provided with spaced projections adapted to be received in said groove and a displaceable spreader carried between and soldered to the free edges of said projections for spreading or deflecting the projection into anchoring engagement with the side walls of the groove as the members are forced together.

2. A method of joining complementary members which consists in providing one member with a groove having both side walls inclined so that they slope towards each other as they approach the mouth of the groove, providing the companion member with spaced projections adapted to enter said groove, soldering a spreader to the free edges of the projections so that a portion of the spreader is seated in the mouth of the space or slot defined by said projections, assembling the members together with the projections partially received in said groove and with the spreader in contact with the bottom wall of the groove and then applying pressure to cause the projections to ride over the spreader and to become wedged between the spreader and the side walls of the groove.

3. A construction comprising complementary members adapted to be joined together in interfitting relation, one of said members being provided with a groove having undercut side walls sloping towards each other as they approach the mouth of the groove, the companion member being provided with spaced projections adapted to be received in said groove, said projections having the outer portions of their opposing surfaces bevelled and a spreader of cylindrical cross section fitted between and soldered to the bevelled portions of said projections, said spreader serving to spread or deflect the projections into anchoring engagement with the side walls of the groove as the two complementary members are forced together during the joining operation.

4. A construction comprising complementary members adapted to be joined together in interfitting relation, one of said members being provided with a groove having undercut side walls sloping towards each other as they approach the mouth of the groove and having opposing portions thereof immediately adjacent the mouth of the groove rounded or bevelled off, the companion member being provided with spaced projections adapted to be received in said groove and having the outer portions of their opposing surfaces bevelled, and a spreader soldered to the bevelled portions of said projections so that a portion of the spreader is positioned beyond the outer portions of the projections for engagement with the bottom wall of the groove, said spreader co-operating with the bevelled portions of said projections to deflect the latter into engagement with the sloping side walls of the groove when the two members are forced together during the joining operation.

HUGH S. VAN PATTER.